United States Patent [19]

Ball et al.

[11] Patent Number: 4,767,893
[45] Date of Patent: Aug. 30, 1988

[54] CABLE CLOSING

[75] Inventors: James H. Ball, St. Paul; William J. Seim, Little Canada, both of Minn.

[73] Assignee: Minnesota Mining and Manufacturing Company, St. Paul, Minn.

[21] Appl. No.: 651,241

[22] Filed: Sep. 17, 1984

[51] Int. Cl.⁴ .............................................. H02G 15/08
[52] U.S. Cl. ..................................... 174/84 R; 156/49; 174/23 C; 174/88 R
[58] Field of Search ................. 174/23 R, 23 C, 84 R, 174/88 R; 156/49

[56] References Cited

U.S. PATENT DOCUMENTS

| 1,656,258 | 1/1928 | Yale | 57/22 X |
| 2,967,795 | 1/1961 | Bollmeier et al. | 174/84 R |
| 3,127,291 | 3/1964 | Betz et al. | 174/84 R |
| 3,203,544 | 8/1965 | Gilbert | 206/216 |
| 3,361,605 | 1/1968 | Gilbert | 156/49 X |
| 3,427,393 | 2/1969 | Masterson | 174/23 R |
| 3,458,648 | 7/1969 | Volker | 174/88 R |
| 3,499,972 | 3/1970 | Smith | 174/88 R |
| 4,314,092 | 2/1982 | Fleming et al. | 174/84 R |
| 4,411,262 | 10/1983 | VonBonin et al. | 264/137 X |
| 4,466,843 | 8/1984 | Shimirak | 156/49 X |

FOREIGN PATENT DOCUMENTS

| 1151960 | 8/1983 | Canada. | |
| 1590958 | 5/1970 | Fed. Rep. of Germany | 174/23 R |
| 1920637 | 10/1970 | Fed. Rep. of Germany | 174/88 R |
| 2837367 | 3/1980 | Fed. Rep. of Germany | 174/88 R |

Primary Examiner—Morris H. Nimmo
Attorney, Agent, or Firm—Donald M. Sell; Terryl K. Qualey

[57] ABSTRACT

A cable closing method and the resultant cable closing constructed by enclosing the cable area to be closed with a flexible waterproof enclosure, wrapping the cable with a water-activatable urethane resin impregnated cloth to span the area enclosed by the flexible waterproof enclosure, wetting the water-activatable urethane resin impregnated cloth to activate the resin and permitting the urethane resin to cure.

14 Claims, 1 Drawing Sheet

CABLE CLOSING

BACKGROUND OF THE INVENTION

The present invention relates to a method for closing a cable, such as a cable splice closure or a cable sheath repair, and the resultant cable closing.

Electrical cables, such as telephone cables, commonly have an outer waterproof sheath surrounding the insulated conductors. Discrete lengths of cable are spliced together by electrically connecting the individual conductors in adjacent cable ends to form a continuous length of cable. The splice is then typically enclosed in a waterproof closure to prevent water from entering the cable at the splice. Breaks in the cable sheath caused during installation or in reaccessing the cable must also be repaired to prevent water from entering the cable. Both cable splices and cable sheath repairs are herein referred to as electrical cable closings.

Cable splice closures typically consist of a hard outer shell into which is poured a hardenable compound. Cable sheath repairs are frequently made with a heat shrink tape or sleeve that covers the damaged area of the cable sheath and is heat shrunk into place to provide a watertight closure. The hard outer shell of the typical splice closure is preferred because it protects the closure against damage, for example when the cable and closure are placed in a trench and covered up with rocks and dirt. However such hard outer shells must be stocked in several sizes to cover the typical range of cables in use and special provisions must be made for cable openings that are unusually long.

Electrical cable closings utilizing a cloth that is impregnated with a resin at the time of application are disclosed in U.S. Pat. Nos. 1,656,258; 3,127,291 and 3,203,544. Since the resin is to be applied in liquid form to the cloth at the time of use, such systems would be messy and difficult to use and they have not found practical utility.

Cloth materials impregnated with water-activatable resins are known for use in creating a hard outer shell, such as a protective cast for a broken arm or leg as disclosed in U.S. Pat. No. 4,411,262 and Canadian Pat. No. 1,151,960. Such materials have not, however, previously been used as a part of an electrical cable closing.

SUMMARY OF THE INVENTION

The present invention provides an electrical cable closing method and the resultant electrical cable closing. The method comprises the steps of enclosing the cable area to be closed with a flexible waterproof enclosure, wrapping the cable with a water-activatable urethane resin impregnated cloth to span the area enclosed by the flexible waterproof enclosure, wetting the water-activatable urethane resin impregnated cloth to activate the resin and permitting the the urethane resin to cure. When the urethane resin has been cured the flexible waterproof enclosure provides the seal around the cable sheath to prevent water from entering the cable, and the cloth and cured resin provide a hard outer shell to protect the flexible waterproof enclosure from being damaged.

THE DRAWING

In the drawing:

FIG. 1 is a side elevation view partially broken away of a method for making a cable splice in accordance with the present invention; and FIG. 2 is a side elevation view of a method for making a cable sheath repair in accordance with the present invention.

DESCRIPTION OF THE PREFERRED EMBODIMENTS

Figure 1:
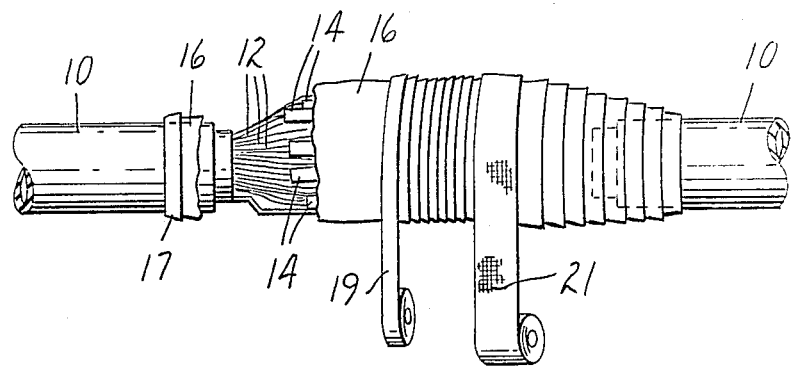

FIG. 1 illustrates a first embodiment of an electrical cable closing constructed in accordance with the present invention comprising a telephone cable splice closure for a grease filled cable. The cable sheaths 10 are cut back to expose the individual insulated wires 12 at the ends of the cables and the individual conductors in one cable end are electrically connected to conductors in the other cable end in electrical connectors 14 in a conventional manner. A transparent plastic sheet 16 having a width greater than the spacing between the cable sheaths 10 is placed around the splice with its edges on the cable sheaths and its free ends above the cable splice. The edges of the plastic sheet 16 are then affixed to the cable sheaths 10 with a vinyl-backed adhesive tape 17, such as Scotch brand 88T from the 3M Company, and the tape 17 is continued up along the edges of the plastic sheet to form an open mouthed bag around the cable splice. A waterproof material that when applied is conformable at room temperature is next introduced into the mouth of the bag in sufficient quantity to fill the voids between the wires 12 in the splice. The waterproof material may, for example, be a reenterable urethane compound such as Scotchcast 4441 from the 3M Company, or a waterproof grease. The free ends of the bag are then folded over to close off the bag and they are rolled down toward the splice to force the waterproof material into the voids between the wires 12. An elastic tape 19 which is preferrably a vinyl-backed adhesive electrical tape, such as Scotchrap brand No. 10 from the 3M Company, is wrapped over the bag from one cable sheath 10 to the other. The plastic sheet 16 forms a thin waterproof barrier and the elastic tape 19 together with the plastic sheet and the waterproof material form a flexible waterproof enclosure around the cable splice.

A water-activatable urethane resin impregnated cloth 21 is wrapped around the cable to span the area enclosed by the flexible waterproof enclosure. The resin impregnated cloth 21 is preferably supplied in a relatively narrow width and in roll form as illustrated, and it is overlapped as it is wrapped around the flexible waterproof enclosure so that the proper amount of material may easily be applied irrespective of the length of the splice. The roll of resin impregnated cloth is preferrably placed in water prior to being wrapped around the flexible waterproof enclosure to begin the activation of the adhesive so that the resin impregnated cloth is already wetted to activate the resin when it is applied. However, it may be preferable in certain installations to apply the urethane resin impregnated cloth and then wet it to activate the resin so as not to risk the possibility that the resin may begin to cure before the cloth is properly positioned around the splice. Finally, the urethane resin is cured by allowing the reaction with the water to go to completion.

Figure 2:
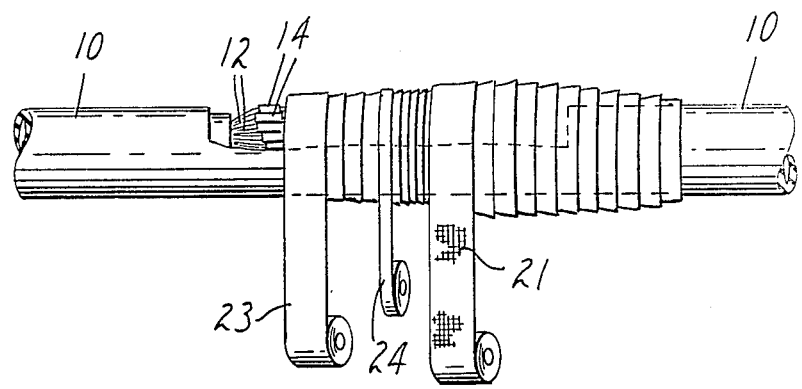

FIG. 2 illustrates a second embodiment of the cable closing of the present invention comprising a cable sheath repair. In the cable sheath repair the cable sheath 10 is cleaned around the damaged area and trimmed back, the wires 12 are checked and any damaged wires are connected with electrical connectors 14 in a conventional manner. A tape 23 having a backing, and a mastic coated on the backing, such as Scotchbrand VM tape from the 3M Company, is wound around the cable to span the sheath repair area with the mastic surface facing the cable. An elastic tape 24, preferably the same tape described above for use in the cable splice closing, is wrapped tightly around the mastic tape 23 over the entire wrapping of the mastic tape to apply pressure to the mastic to compress it against the cable sheath around the repair area and with the mastic tape 23 to produce a flexible waterproof enclosure around the cable sheath repair. A water-activatable urethane resin impregnated cloth 21 is then wrapped around the cable to span the area enclosed by the flexible waterproof enclosure. As with the cable splice, the resin impregnated cloth 21 may be wetted prior to or after wrapping around the cable area to be closed. And, as with the cable splice, the urethane resin is cured after the resin impregnated cloth 21 is wrapped around the cable. This sheath repair construction has been found useful on pressurized telephone cables as well as grease filled cables.

The presently preferred cloth is fiber glass cloth because it is a relatively inexpensive cloth material that does not absorb moisture, because moisture absorbed by the cloth would at least partially activate the preferred urethane resin even though sealed in a waterproof bag. The fiber glass or other fiber is preferably knitted to give a maximum elongation. Elongations on the order of 10% or more are preferred, with greater elongations giving the best results in adapting to cover changing cable repair diameters smoothly, without wrinkles that could compromise strength and be snagged in service. The knit material is heated to remove moisture, and stored in a dried or dehumified condition before coating. In the case of knitted glass fibers, a high temperature is used to remove moisture and to burn off the starch and oil mixture used as a knitting size lubricant. Removal of the starch and oil has been found to be necessary to obtain a good bond of the resin to glass and to obtain the best fungus and weathering resistance.

The preferred water-activatable urethane resin is

| Material | Weight Percent |
| --- | --- |
| Diphenylmethane Diisocyanate | 50.90 |
| Propylene Glycol | 39.90 |
| Dimorpholinodiethylether | 1.86 |
| Benzoyl Chloride | 0.06 |
| Silicone Antifoam Surfactant | 0.18 |
| Propyl Paraben | 1.00 |
| Hindered Phenol Antioxidant | 1.00 |
| Dihydroxybenzoyl Phenone | 0.50 |
| $Fe_3O_4$ (Iron Oxide Powder) | 4.60 |
| | 100.00 |

The first three ingredients form the resin, the third being the catalyst. The diphenylmethane diisocyanate is available from Upjohn as Isonate 143, the propylene glycol preferrably has a molecular weight of 725 and is available from Union Carbide as PPG 725, and the dimorpholinodiethylether is available from Texaco as Thancat DMDEE. Benzoyl chloride acts as a stabilizer. The preferred silicone antifoam surfactant is DB-100 from Dow Corning. Propyl paraben is a fungicide to prevent deterioration of the closure when placed in the ground or in other humid locations. The preferred hindered phenol antioxidant is Irganox AO-1010 from Ciba-Geigy. The dihydroxybenzoyl phenone provides resistance to ultra-violet light and it is preferrably Uvinol UV-400 from GAF. The iron oxide acts as an ultra-violet light blocker and as a filler and is preferrably Bayferrox Black 306 from Mobay Chemical Corp.

The preferred water-activatable urethane resin is coated on a knit fiber glass cloth in the desired width to impregnate the cloth. It is presently preferred to coat 47 grams of the resin on 53 grams of fiber glass cloth.

The preferred resin is activatable with a small amount of water and, therefore, the resin impregnated cloth is supplied in a heat sealed, waterproof, vapor and oxygen impermeable bag. In high humidity areas adequate wetting of the resin impregnated cloth can be obtained by removing the cloth from the waterproof bag and exposing it to the humidity in the air but to assure more rapid and complete activation it is preferred to place the resin impregnated cloth in water before wrapping it around the cable or to spray it with water after it has been wrapped around the cable.

We claim:

1. An electrical cable closing method for a cable including an outer waterproof sheath, comprising:
   enclosing the cable area to be closed with a flexible waterproof enclosure,
   wrapping the cable with a water activatable urethane resin impregnated cloth to span the area enclosed by the flexible waterproof enclosure,
   wetting the water activatable urethane resin impregnated cloth to activate the resin, and
   permitting the urethane resin to cure.

2. The electrical cable closing method of claim 1 wherein said flexible waterproof enclosure comprises a waterproof material that when applied is conformable at room temperature to fill the voids in the cable opening and a thin water barrier material over the conformable waterproof material.

3. The electrical cable closing method of claim 2 for creating a cable splice closure wherein said thin water barrier material is a water barrier film wrapped around the cable splice and affixed to the cable sheath at the ends of the splice area.

4. The electrical cable splice closing method of claim 3 wherein said step of enclosing the cable area to be closed includes tightly wrapping an elastic tape around said water barrier film before applying said urethane resin impregnated cloth.

5. The electrical cable closing method of claim 1 for creating a cable sheath repair wherein said flexible waterproof enclosure comprises a tape having a backing and a mastic coated on the backing, the tape being wound around the cable to span the sheath repair area with the mastic coating on the backing facing the cable.

6. The electrical cable sheath repair method of claim 5 wherein said step of enclosing the cable area to be closed includes tightly wrapping an elastic tape around said mastic tape before applying said urethane impregnated cloth.

7. The electrical cable closing method of claim 1 wherein said urethane resin impregnated cloth is a fiber glass cloth.

8. An electrical cable closing in a cable including an outer waterproof sheath, comprising:
   a flexible waterproof enclosure enclosing an opening in the cable, and
   a water activated urethane resin impregnated cloth wrapped around the cable to span the area surrounded by the waterproof enclosure, said urethane resin having been wetted and having been cured after said cloth is wrapped around the cable.

9. The electrical cable closing of claim 8 wherein said flexible waterproof enclosure comprises a waterproof material that fills the voids in the cable opening and a thin water barrier material over the waterproof material.

10. The electrical cable closing of claim 9 comprising a cable splice wherein said thin water barrier material is a water barrier film wrapped around the cable splice and affixed to the cable sheath at the ends of the splice area.

11. The electrical cable closing of claim 10 including an elastic tape wrapped around said barrier film.

12. The electrical cable closing of claim 9 comprising a sheath repair wherein said waterproof material and said thin water barrier material comprise a tape having a backing and a mastic coated on the backing, the tape being wound around the cable to span the sheath repair area with the mastic coating on the backing facing the cable.

13. The electrical cable sheath repair of claim 12 including an elastic tape tightly wrapped around said tape.

14. The electrical cable closing of claim 8 wherein said urethane resin impregnated cloth is a fiber glass cloth.

* * * * *